United States Patent
Makino et al.

(10) Patent No.: US 11,364,489 B2
(45) Date of Patent: Jun. 21, 2022

(54) EXHAUST GAS PURIFYING CATALYST

(71) Applicants: CATALER CORPORATION, Kakegawa (JP); TOYOTA JIDOSHA KABUSHIKI KAISHA, Toyota (JP)

(72) Inventors: Haruka Makino, Kakegawa (JP); Yasutaka Nomura, Kakegawa (JP); Satoru Inoda, Kakegawa (JP); Kenji Nakajima, Kakegawa (JP); Naoto Miyoshi, Nagoya (JP); Takeru Yoshida, Miyoshi (JP); Akemi Sato, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 16/649,453

(22) PCT Filed: Oct. 12, 2018

(86) PCT No.: PCT/JP2018/038023
§ 371 (c)(1),
(2) Date: Mar. 20, 2020

(87) PCT Pub. No.: WO2019/078096
PCT Pub. Date: Apr. 25, 2019

(65) Prior Publication Data
US 2020/0276568 A1    Sep. 3, 2020

(30) Foreign Application Priority Data
Oct. 19, 2017  (JP) .............................. JP2017-202903

(51) Int. Cl.
*B01J 23/56*  (2006.01)
*B01J 35/00*  (2006.01)
(Continued)

(52) U.S. Cl.
CPC .......... *B01J 35/04* (2013.01); *B01D 53/9413* (2013.01); *B01J 23/56* (2013.01); *B01J 35/0006* (2013.01);
(Continued)

(58) Field of Classification Search
CPC ........ B01J 23/56; B01J 35/0006; B01J 35/04; B01D 53/9413; F01N 3/2825
See application file for complete search history.

(56) References Cited

U.S. PATENT DOCUMENTS 7,871,452 B2 *  1/2011  Yamada ................. B01J 37/024
                                          55/523
8,133,841 B2 *  3/2012  Noda ................. B01D 46/2429
                                          502/439
(Continued)

FOREIGN PATENT DOCUMENTS

EP    2 873 817 A1    5/2015
JP    2002-188435 A   7/2002
(Continued)

OTHER PUBLICATIONS

Nov. 27, 2018 Search Report issued in International Patent Application No. PCT/JP2018/038023.
(Continued)

*Primary Examiner* — Cam N. Nguyen
(74) *Attorney, Agent, or Firm* — Oliff PLC

(57) ABSTRACT

An exhaust gas purifying catalyst includes: a wall-flow structure substrate including an inlet cell, an outlet cell, and a porous partition; a first catalyst layer formed inside the partition such that a thickness of the first catalyst layer is between 40% and 60%, inclusive, of an overall thickness $T_w$ of the partition; and a second catalyst layer formed inside the
(Continued)

partition such that the second catalyst layer extends across an entire region of the partition in a thickness direction thereof.

6 Claims, 6 Drawing Sheets

(51) Int. Cl.
*B01D 53/94* (2006.01)
*F01N 3/28* (2006.01)
*B01J 35/04* (2006.01)

(52) U.S. Cl.
CPC .... *F01N 3/2825* (2013.01); *B01D 2255/1023* (2013.01); *B01D 2255/1025* (2013.01); *B01D 2255/9155* (2013.01); *F01N 2330/06* (2013.01); *F01N 2330/30* (2013.01); *F01N 2370/02* (2013.01)

(56) References Cited

U.S. PATENT DOCUMENTS

| | | | |
|---|---|---|---|
| 8,409,519 B2* | 4/2013 | Watanabe | B01J 23/58 422/180 |
| 10,071,368 B2* | 9/2018 | Onoe | B01J 35/0006 |
| 10,076,725 B2* | 9/2018 | Onoe | F01N 3/0222 |
| 10,125,649 B2* | 11/2018 | Onoe | F01N 3/035 |
| 10,159,934 B2* | 12/2018 | Kitamura | B01D 53/94 |
| 10,159,935 B2* | 12/2018 | Onoe | B01D 53/9468 |
| 10,344,655 B2* | 7/2019 | Onoe | B01D 53/94 |
| 10,357,744 B2* | 7/2019 | Ohashi | B01J 35/0006 |
| 2008/0314008 A1 | 12/2008 | Komori et al. | |
| 2009/0087365 A1 | 4/2009 | Klingmann et al. | |
| 2017/0095798 A1 | 4/2017 | Onoe et al. | |
| 2017/0296969 A1 | 10/2017 | Ohashi et al. | |
| 2017/0298797 A1 | 10/2017 | Onoe et al. | |
| 2017/0306823 A1 | 10/2017 | Onoe et al. | |
| 2018/0028972 A1 | 2/2018 | Kitamura et al. | |
| 2018/0133648 A1 | 5/2018 | Sekine et al. | |
| 2020/0276567 A1 | 9/2020 | Onoe et al. | |

FOREIGN PATENT DOCUMENTS

| | | |
|---|---|---|
| JP | 2007-185571 A | 7/2007 |
| JP | 2009-511242 A | 3/2009 |
| JP | 2009-082915 A | 4/2009 |
| JP | 2011-038410 A | 2/2011 |
| JP | 2016-078016 A | 5/2016 |
| JP | 2017-072033 A | 4/2017 |
| JP | 6386697 B1 | 9/2018 |
| WO | 2014/002772 A1 | 1/2014 |
| WO | 2016/060048 A1 | 4/2016 |
| WO | 2016/060050 A1 | 4/2016 |
| WO | 2016/133086 A1 | 8/2016 |
| WO | 2016/160988 A1 | 10/2016 |
| WO | 2017/163984 A1 | 9/2017 |

OTHER PUBLICATIONS

Apr. 8, 2021 Office Action issued in Japanese Patent Application No. 2019-549236.
Apr. 21, 2020 International Preliminary Report on Patentability issued in International Patent Application No. PCT/JP2018/038023.
Sep. 15, 2020 Extended Search Report issued in European Patent Application No. 18867459.2.

* cited by examiner

→ DIRECTION OF EXTENSION
(LONGITUDINAL DIRECTION)

EXHAUST GAS PURIFYING CATALYST

TECHNICAL FIELD

The present invention relates to exhaust gas purifying catalysts. More particularly, the present invention relates to an exhaust gas purifying catalyst having a wall-flow structure.

This application claims priority to Japanese Patent Application No. 2017-202903 filed on Oct. 19, 2017, the entire contents of which are incorporated herein by reference.

BACKGROUND ART

Exhaust gas emitted from internal combustion engines usually contains, for example, particulate matter (PM) composed mainly of carbon. Such particulate matter is known to be a cause for air pollution. Regulations on emission of particulate matter, along with other harmful components (such as hydrocarbon (HC), carbon monoxide (CO), and nitrogen oxide (NOx) contained in exhaust gas), have thus been tightened year by year. To cope with such regulations, techniques to collect and remove particulate matter from exhaust gas have been proposed.

In connection with this, a particulate filter known in the art is provided inside an exhaust passage for an internal combustion engine so as to collect particulate matter. A gasoline engine, for example, emits a certain amount of particulate matter along with exhaust gas, although the amount of particulate matter emitted from a gasoline engine is smaller than the amount of particulate matter emitted from a diesel engine. The inside of an exhaust passage for a gasoline engine may thus be fitted with a gasoline particulate filter (GPF). Such a particulate filter known in the art has a wall-flow structure that includes a large number of porous cells, inlets and outlets of which are alternately closed. Exhaust gas that has flowed, through the inlets, into the particulate filter having the wall-flow structure passes through a porous cell partition that partitions the cells and is discharged to the outlets. During passage of the exhaust gas through the porous cell partition, particulate matter is collected on the surface of the partition and/or collected into the partition. To further enhance purification performance, recent studies focus on a precious metal catalyst supported on a particulate filter. Conventional technologies concerning a filter catalyst including a precious metal catalyst supported on a particulate filter are disclosed in Patent Literatures 1 and 2 below.

CITATION LIST

Patent Literature

Patent Literature 1: Japanese Patent Application Publication No. 2009-82915
Patent Literature 2: Japanese Patent Application Publication No. 2007-185571

SUMMARY OF INVENTION

Patent Literature 1 discloses a filter catalyst including a Pd layer containing palladium (Pd) and a Rh layer containing rhodium (Rh). The Pd layer is disposed inside a partition. The Rh layer is stacked on the surface of the partition. The technique disclosed in this literature, however, involves forming the Rh layer outside the partition. This increases flow passage resistance during passage of exhaust gas through the partition, resulting in an increase in pressure loss (hereinafter also referred to as "pressure drop"). Such an increase in pressure loss may adversely affect, for example, engine performance. From the viewpoint of preventing troubles, such as a reduction in fuel efficiency and an engine failure, a pressure drop is desirably kept as low as possible. Patent Literature 2 discloses a filter catalyst including a Pt layer containing platinum (Pt) and a Rh layer containing rhodium. The Pt layer and the Rh layer are separately supported inside a partition. Merely disposing the catalyst layers inside the partition without due consideration as disclosed in this literature, however, may result in a reduction in efficiency of use of the catalyst and/or an increase in pressure drop. This proves that this filter catalyst is insufficient for further enhancement of purification performance.

The present invention has been made in view of the above circumstances, and its main object is to provide an exhaust gas purifying catalyst that includes a particulate filter having a wall-flow structure and is able to achieve both of a reduction in pressure drop and high purification performance.

An exhaust gas purifying catalyst according to the present invention is an exhaust gas purifying catalyst to purify exhaust gas emitted from an internal combustion engine. The exhaust gas purifying catalyst is disposed in an exhaust passage for the internal combustion engine. The exhaust gas purifying catalyst includes: a wall-flow structure substrate including an inlet cell open only at an exhaust gas inflow end, an outlet cell open only at an exhaust gas outflow end, and a porous partition that partitions the inlet cell and the outlet cell; a first catalyst layer formed in a region inside the partition and in contact with at least the inlet cell such that the first catalyst layer extends in a direction of extension of the partition from the exhaust gas inflow end; and a second catalyst layer formed in a region inside the partition and in contact with at least the outlet cell such that the second catalyst layer extends in the direction of extension of the partition from the exhaust gas outflow end. Assuming that the partition has an overall thickness $T_w$ in a thickness direction perpendicular to the direction of extension, the first catalyst layer is formed inside the partition such that a thickness $T_1$ of the first catalyst layer is between 40% and 60%, inclusive, of the thickness $T_w$, and the second catalyst layer is formed inside the partition such that the second catalyst layer extends across an entire region of the partition in the thickness direction. An exhaust gas purifying catalyst having this structure achieves, at a high level, both of a reduction in pressure drop and enhanced purification performance.

In a preferred embodiment of the exhaust gas purifying catalyst disclosed herein, a length $L_1$ of the first catalyst layer is between 50% and 90%, inclusive, of a total length $L_w$ of the partition in the direction of extension. The length $L_1$ of the first catalyst layer falling within this range achieves, at a higher level, both of a reduction in pressure drop and enhanced purification performance.

In a preferred embodiment of the exhaust gas purifying catalyst disclosed herein, a length $L_2$ of the second catalyst layer is between 20% and 80%, inclusive, of a total length $L_w$ of the partition in the direction of extension. The length $L_2$ of the second catalyst layer falling within this range achieves, at a higher level, both of a reduction in pressure drop and enhanced purification performance.

In a preferred embodiment of the exhaust gas purifying catalyst disclosed herein, assuming that the first catalyst layer has a length $L_1$, the second catalyst layer has a length $L_2$, and the partition has a total length $L_w$ in the direction of extension, the lengths $L_w$, $L_1$, and $L_2$ satisfy the following expression: $L_w<(L_1+L_2)<2L_w$, and the first catalyst layer and the second catalyst layer partially overlap with each other in the direction of extension. The first catalyst layer and the second catalyst layer partially overlapping with each other in the direction of extension in this manner more suitably achieve the effect of enhancing purification performance described above.

In a preferred embodiment of the exhaust gas purifying catalyst disclosed herein, the first catalyst layer contains a precious metal that is rhodium (Rh), and the second catalyst layer contains a precious metal that is palladium (Pd). This facilitates purification of NOx in the first catalyst layer. Consequently, exhaust gas purification performance is further enhanced.

In a preferred embodiment of the exhaust gas purifying catalyst disclosed herein, a ratio of a content of Rh in the first catalyst layer to a content of Pd in the second catalyst layer is between 0.1 and 2 inclusive. The ratio is represented as Rh/Pd. The content ratio (Rh/Pd) falling within this range more successfully achieves the effects described above.

In a preferred embodiment of the exhaust gas purifying catalyst disclosed herein, the internal combustion engine is a gasoline engine. The temperature of exhaust gas emitted from a gasoline engine is relatively high, making it difficult for PM to be deposited inside the partition. Thus, the internal combustion engine that is a gasoline engine more effectively achieves the effects described above.

DESCRIPTION OF EMBODIMENTS

Figure 1:
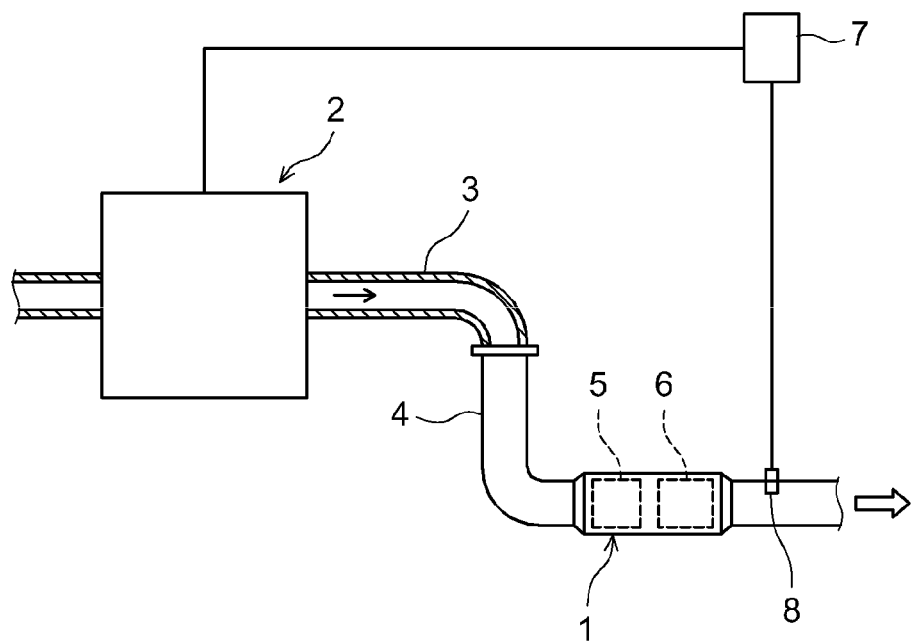
FIG. 1 is a diagram schematically illustrating an exhaust gas purifier according to one embodiment.

Preferred embodiments of the present invention will be described below with reference to the drawings. In the following drawings, components or elements having the same functions are identified by the same reference signs, and description thereof may be omitted or simplified when redundant. Dimensional relationships (e.g., lengths, widths, and thicknesses) in the drawings do not necessarily reflect actual dimensional relationships. Matters other than those particularly mentioned herein and necessary to carry out the present invention (e.g., general matters, such as one concerning the location of a particulate filter in an automobile) are recognizable as matters to be designed by a person skilled in the art on the basis of technologies known in this field. The present invention may be carried out on the basis of the description disclosed herein and common technical knowledge in this field.

First, a structure of an exhaust gas purifier according to an embodiment of the present invention will be described with reference to FIG. 1. An exhaust gas purifier 1 disclosed herein is provided in an exhaust system for an internal combustion engine. FIG. 1 schematically illustrates an internal combustion engine 2 and the exhaust gas purifier 1 provided in an exhaust system for the internal combustion engine 2.

An air-fuel mixture containing oxygen and fuel gas is supplied to the internal combustion engine (or engine) 2. The internal combustion engine 2 combusts the air-fuel mixture so as to convert fuel energy into mechanical energy. The air-fuel mixture combusted during this process becomes exhaust gas and is discharged to the exhaust system. The internal combustion engine 2 according to the present embodiment consists mainly of a gasoline engine for an automobile.

The exhaust system for the engine 2 will be described. An exhaust port (not illustrated) through which the engine 2 is in communication with the exhaust system is connected with an end of an exhaust manifold 3. The other end of the exhaust manifold 3 is connected to an exhaust pipe 4 through which exhaust gas flows. The exhaust manifold 3 and the exhaust pipe 4 define an exhaust passage according to the present embodiment. The arrows in FIG. 1 indicate the direction in which the exhaust gas flows.

The exhaust gas purifier 1 is provided in the exhaust system for the engine 2. The exhaust gas purifier 1 includes a catalyst section 5, a filter section 6, and an engine control unit (ECU) 7. The exhaust gas purifier 1 purifies harmful components (e.g., carbon monoxide (CO), hydrocarbon (HC), and nitrogen oxide (NOx)) contained in the exhaust gas emitted from the engine 2, and collects particulate matter (PM) contained in the exhaust gas. The exhaust gas purifier 1 may further include, for example, a downstream catalyst section disposed downstream of the filter section 6.

The ECU 7 exercises control between the engine 2 and the exhaust gas purifier 1. Similarly to, for example, widely used controllers, the ECU 7 includes components, such as an electronic device (e.g., a digital computer). The ECU 7 is typically provided with an input port. The ECU 7 is electrically connected through the input port to sensors (e.g., a pressure sensor 8) each disposed on an associated component of the engine 2 or the exhaust gas purifier 1. Information detected by each of the sensors is thus transmitted through the input port to the ECU 7 in the form of an electric signal. The ECU 7 is further provided with an output port. The ECU 7 is electrically connected through the output port to the components of the engine 2 and the exhaust gas purifier 1. The ECU 7 transmits a control signal so as to control operations of the components of the engine 2 and the exhaust gas purifier 1.

The catalyst section 5 is able to purify the ternary components (i.e., NOx, HC, and CO) contained in the exhaust gas. The catalyst section 5 is provided in the exhaust pipe 4 in communication with the engine 2. Specifically, the catalyst section 5 is provided in a downstream portion of the exhaust pipe 4 as illustrated in FIG. 1. The catalyst section 5 is not limited to any particular type of catalyst. The catalyst section 5 may be a catalyst on which catalytic metal, such as platinum (Pt), palladium (Pd), or rhodium (Rh), for example, is supported. The specific structure of the catalyst section 5 does not characterize the present invention, and detailed description of the catalyst section 5 will thus be omitted.

The filter section 6 is provided downstream of the catalyst section 5. The filter section 6 includes a gasoline particulate filter (GPF) that is able to collect and remove particulate matter (hereinafter simply referred to as "PM") contained in the exhaust gas. The particulate filter includes two catalytic metal-containing catalyst layers (which will be described below). The particulate filter functions as an exhaust gas purifying catalyst. The exhaust gas purifying catalyst (or filter catalyst) according to the present embodiment will be described in detail below.

Exhaust Gas Purifying Catalyst

Figure 2:
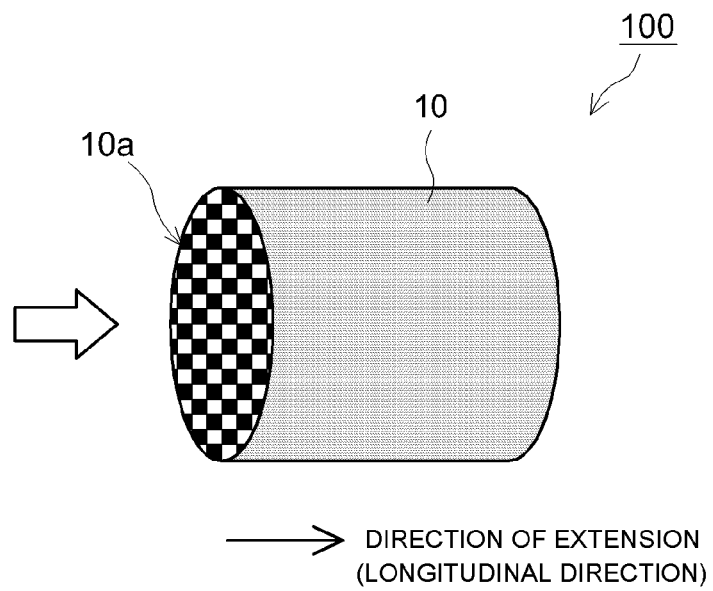
FIG. 2 is a schematic perspective view of a honeycomb substrate of an exhaust gas purifying catalyst according to one embodiment.
Figure 3:
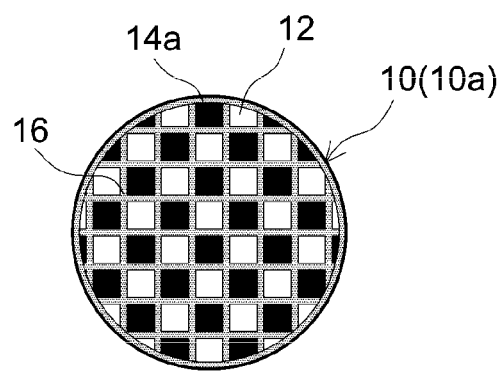
FIG. 3 is a diagram schematically illustrating an end of the honeycomb substrate illustrated in FIG. 2.
Figure 4:
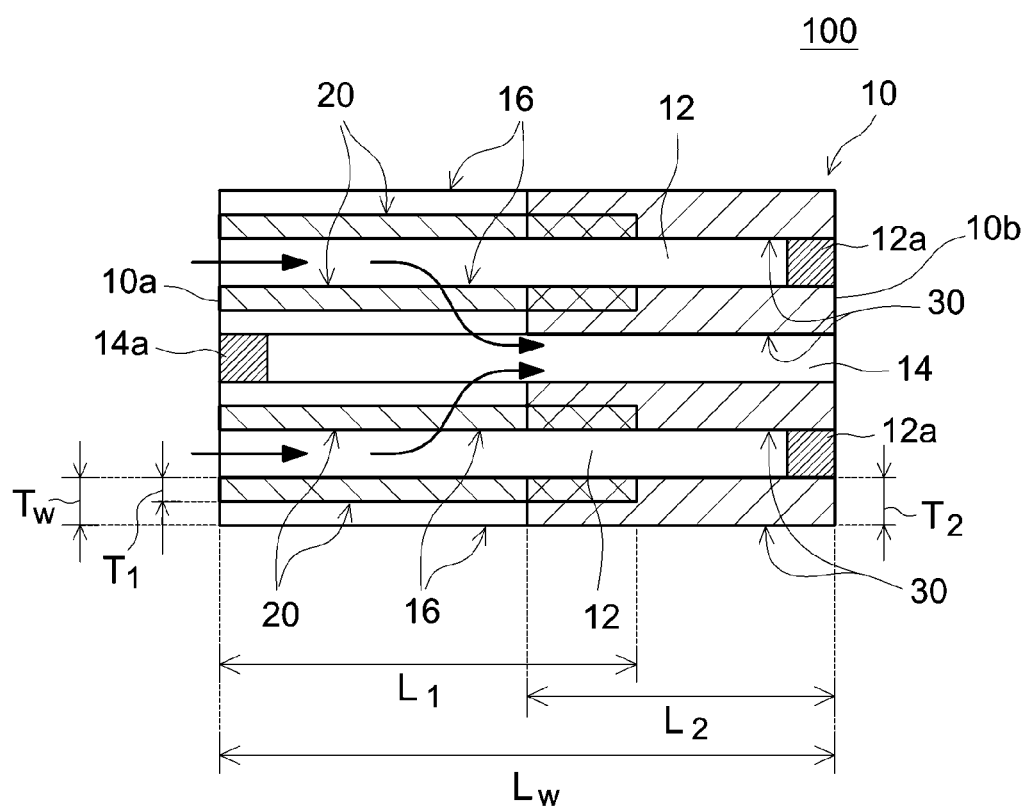
FIG. 4 is a partially enlarged diagram schematically illustrating a cross-sectional structure of the exhaust gas purifying catalyst according to one embodiment adjacent to a partition thereof.

The exhaust gas purifying catalyst disclosed herein includes a substrate having a wall-flow structure, and two catalyst layers (i.e., a first catalyst layer and a second catalyst layer) provided in a partition of the substrate. FIG. 2 is a schematic diagram illustrating an example of a substrate 10. FIG. 3 is a schematic diagram illustrating an exhaust gas inflow end 10a of the substrate 10. FIG. 4 is a partially enlarged diagram schematically illustrating a cross-sectional structure of the substrate 10 adjacent to a partition 16 thereof.

Substrate

As illustrated in FIGS. 2 to 4, the wall-flow structure substrate 10 includes: inlet cells 12 open only at the exhaust gas inflow end 10a; outlet cells 14 adjacent to the inlet cells 12 and open only at an exhaust gas outflow end 10b; and the partition 16 which is porous and by which the inlet cells 12 and the outlet cells 14 are partitioned.

Various materials in various forms that have conventionally been used for this type of purpose are usable for the substrate 10. A substrate made of ceramic, such as cordierite or silicon carbide (SiC), or an alloy (e.g., stainless steel) may preferably be used as the substrate 10. The substrate 10 illustrated in FIGS. 2 and 3 is a honeycomb substrate (or honeycomb structure) that is cylindrical in outer shape. Instead of having a cylindrical shape, the substrate 10 may alternatively be elliptically cylindrical or polygonally tubular in overall shape (or outer shape). The capacity of the substrate 10 (which is a total cell volume) is about 0.1 L or more, typically 0.5 L or more, and is about 5 L or less, typically 3 L or less, and preferably 2 L or less, for example. A total length of the substrate 10 in the direction of extension thereof (i.e., a total length $L_w$ of the partition 16 in the direction of extension thereof) is typically between 10 mm and 500 mm and preferably between about 50 mm and about 300 mm, for example.

The inlet cells 12 are open only at the exhaust gas inflow end 10a. The outlet cells 14 are adjacent to the inlet cells 12 and open only at the exhaust gas outflow end 10b. In the present embodiment, the inlet cells 12 are sealed off at the exhaust gas outflow end 10b by seals 12a. The outlet cells 14 are sealed off at the exhaust gas inflow end 10a by seals 14a. The inlet cells 12 and the outlet cells 14 preferably have suitable shapes and sizes in consideration of the flow rate of exhaust gas to be supplied to an exhaust gas purifying catalyst 100 and the components of the exhaust gas. The inlet cells 12 and the outlet cells 14 may have, for example, any of various geometric shapes, such as rectangular shapes (e.g., a square, a parallelogram, an oblong, and a trapezoid), a triangular shape, other polygonal shapes (e.g., a hexagon and an octagon), and a circular shape.

The partition 16 is provided between the inlet cells 12 and the outlet cells 14. The partition 16 partitions the inlet cells 12 and the outlet cells 14. The partition 16 has a porous structure that allows passage of exhaust gas therethrough. The partition 16 may have any porosity. The porosity of the partition 16 may be between about 40% and about 70%, may be, for example, between 50% and 70%, and may preferably be between 55% and 65%. The partition 16 having an excessively low porosity is not preferable because a pressure drop may increase. The partition 16 having an excessively high porosity is not preferable because the mechanical strength of the exhaust gas purifying catalyst 100 tends to decrease. The partition 16 may have any thickness. The thickness of the partition 16 may be between about 50 μm and about 2000 μm and may preferably be between about 100 μm and about 800 μm, for example. The partition having a thickness in this range achieves the effect of preventing an increase in pressure drop without reducing the efficiency of collection of PM. From the viewpoint of improving PM collecting performance and preventing a pressure drop, the partition 16 normally has an average pore size of between about 1 μm and about 60 μm and preferably has an average pore size of between 10 μm and 40 μm, for example.

Catalyst Layer

As illustrated in FIG. 4, the exhaust gas purifying catalyst 100 disclosed herein includes a first catalyst layer 20 and a second catalyst layer 30. The first catalyst layer 20 is formed in regions inside the partition 16 and in contact with at least the inlet cells 12. The first catalyst layer 20 extends in the direction of extension of the partition 16 from the exhaust gas inflow end 10a. The second catalyst layer 30 is formed in regions inside the partition 16 and in contact with at least the outlet cells 14. The second catalyst layer 30 extends in the direction of extension of the partition 16 from the exhaust gas outflow end 10b. The first catalyst layer 20 is formed inside the partition 16 such that the first catalyst layer 20 has a thickness $T_1$ in a thickness direction perpendicular to the direction of extension. Assuming that the partition 16 has an overall thickness $T_w$, the thickness $T_1$ is between 40% and 60%, inclusive, of the thickness $T_w$. This means that $0.4T_w \leq T_1 \leq 0.6T_w$. The second catalyst layer 30 is formed inside the partition 16 such that the second catalyst layer 30 extends across an entire region of the partition 16 in the thickness direction thereof.

As used herein, the term "catalyst layer disposed inside the partition" refers to a catalyst layer that is not present outside the partition (or typically, on the surface of the partition) but is present mainly inside the partition. More specifically, suppose that the entire coating amount of a catalyst layer is 100%, for example, when a cross section of the partition 16 is observed using an electron microscope. In this case, the coating amount of the catalyst layer present inside the partition 16 is typically 80% or more (e.g., 85% or more), preferably 90% or more, more preferably 95% or more, or in particular, substantially 100%. Accordingly, the "catalyst layer disposed inside the partition" is clearly different from a catalyst layer, a portion of which unintentionally penetrates into the partition when the catalyst layer is disposed, for example, on the surface of the partition 16.

The thickness $T_1$ of the first catalyst layer 20 disposed on the exhaust gas inflow side is between 40% and 60%, inclusive, of the thickness $T_w$ of the partition 16 in the thickness direction, and the second catalyst layer 30 disposed on the exhaust gas outflow side is provided across the entire region of the partition 16 in the thickness direction.

This achieves, at a high level, both of a reduction in pressure drop and enhanced purification performance. Such effects are believed to be achieved because of, for example, the reasons below, although they should not be interpreted in any limited sense. A large portion of the exhaust gas, which has flowed into the exhaust gas purifying catalyst 100, travels within the inlet cells 12 and moves to the end 10*b* through the partition 16 in a scattering manner. The first catalyst layer 20 is thus concentratedly disposed in regions of the partition 16 close to the inlet cells 12, such that $0.4T_w \leq T_1 \leq 0.6T_w$. This increases the frequency of contact between the exhaust gas and the catalyst so as to efficiently purify the exhaust gas. The second catalyst layer 30 is provided across the entire region of the partition 16 in the thickness direction so as to eliminate or reduce the occurrence of an unfavorable situation where flow paths within the pores of the partition 16 are narrowed by the catalyst. This is believed to contribute to a reduction in pressure drop and enhanced purification performance.

In the thickness direction perpendicular to the direction of extension, the thickness (or average thickness) $T_1$ of the first catalyst layer 20, which is deemed suitable, is usually about 40% or more of the thickness $T_w$ of the partition 16 (which means that $0.4T_w \leq T_1$) From the viewpoint of achieving, for example, a reduction in pressure drop, the thickness $T_1$ of the first catalyst layer 20 may preferably be 42% or more of the thickness $T_w$, may more preferably be 45% or more of the thickness $T_w$, and may still more preferably be 50% or more of the thickness $T_w$. In some embodiments, the thickness $T_1$ of the first catalyst layer 20 may be, for example, 52% or more of the thickness $T_w$ or may typically be 55% or more of the thickness $T_w$. An upper limit to the thickness $T_1$ of the first catalyst layer 20 is usually about 60% or less of the thickness $T_w$ of the partition 16 (which means that $T_1 \leq 0.6T_w$). From the viewpoint of achieving, to a high degree, both of a reduction in pressure drop and enhanced purification performance, for example, the thickness $T_1$ of the first catalyst layer 20 may preferably be 58% or less of the thickness $T_w$, may more preferably be 55% or less of the thickness $T_w$, and may still more preferably be 52% or less of the thickness $T_w$. From the viewpoint of achieving, to a high degree, both of favorable purification performance and a reduction in pressure drop, the exhaust gas purifying catalyst preferably includes, for example, the first catalyst layer 20 having the thickness $T_1$ falling within the following range: $0.45T_w \leq T_1 \leq 0.55T_w$.

In the thickness direction perpendicular to the direction of extension, the second catalyst layer 30 is formed across the entire region of the partition 16 in the thickness direction thereof. As used herein, the term "formed across the entire region of the partition in the thickness direction thereof" for the thickness of the second catalyst layer 30 refers to the thickness $T_2$ of the second catalyst layer 30 that is 90% or more of the overall thickness $T_w$ of the partition 16. From the viewpoint of reducing a pressure drop, for example, the thickness $T_2$ of the second catalyst layer 30 is preferably 92% or more of the thickness $T_w$, more preferably 95% or more of the thickness $T_w$, and still more preferably 98% or more of the thickness $T_w$. Accordingly, manufacturing errors and variations, for example, are allowable. In a preferred embodiment, the second catalyst layer 30 whose thickness $T_2$ is 100% of the thickness $T_w$ is formed inside the partition 16 such that the second catalyst layer 30 is in contact with both of the outlet cells 14 and the inlet cells 12. Providing the second catalyst layer 30 across the entire region of the partition 16 in this manner achieves, at a higher level, both of a reduction in pressure drop and enhanced purification performance.

First Catalyst Layer

The first catalyst layer 20 is formed in regions inside the partition 16 and in contact with the inlet cells 12 such that the first catalyst layer 20 extends in the direction of extension of the partition 16 from the exhaust gas inflow end 10*a*. A length (or average length) $L_1$ of the first catalyst layer 20 in the direction of extension is not limited to any particular length. The length $L_1$ of the first catalyst layer 20 may be shorter than the total length $L_w$ of the partition 16. In other words, the lengths $L_1$ and $L_w$ may satisfy the following relationship: $L_1 < L_w$. From the viewpoint of efficiently purifying exhaust gas or reducing a pressure loss, for example, the length $L_1$ of the first catalyst layer 20 is about 30% or more of the length $L_w$ (which means that $0.3L_w \leq L_1$), typically 40% or more (e.g., 45% or more) of the length $L_w$, and preferably 50% or more of the length L. In some embodiments, the length $L_1$ of the first catalyst layer 20 may be about 55% or more of the length $L_w$, may typically be 60% or more of the length $L_w$, and may preferably be 70% or more (e.g., 80% or more) of the length L. From the viewpoint of enhancing manufacturability and quality stability, the length $L_1$ of the first catalyst layer 20 is about 90% or less of the length $L_w$ (which means that $L_1 \leq 0.9L_w$), typically 85% or less (e.g., 80% or less) of the length $L_w$, and optionally 75% or less of the length L. The techniques disclosed herein may be preferably carried out in an embodiment where the length $L_1$ of the first catalyst layer 20 is determined in relation to the total length $L_w$ of the partition 16 such that $0.3L_w \leq L_1 \leq 0.9L_w$, $0.5L_w \leq L_1 \leq 0.9L_w$, $0.5L_w \leq L_1 \leq 0.8L_w$, $0.7L_w \leq L_1 \leq 0.9L_w$, or $0.8L_w \leq L_1 \leq 0.9L_w$.

The first catalyst layer 20 may include a catalytic metal that functions as an oxidation and/or reduction catalyst, and a support that supports the catalytic metal. Examples of the catalytic metal include precious metals belonging to the platinum group, such as rhodium (Rh), palladium (Pd), and platinum (Pt). Alternatively, any of the following metals may be used: ruthenium (Ru), osmium (Os), iridium (Ir), silver (Ag), and gold (Au). An alloy of two or more of these metals may be used. The catalytic metal may be other types of metal, such as alkali metal, alkaline-earth metal, and transition metal. From the viewpoint of increasing the area of contact with exhaust gas, the catalytic metal is preferably used in the form of fine particles having a sufficiently small particle size. The mean particle diameter of the catalytic metal particles is normally between about 0.1 nm and about 20 nm. The mean particle diameter of the catalytic metal particles is, for example, between 1 nm and 10 nm, preferably 7 nm or less, and more preferably 5 nm or less. The mean value of particle diameters of particles observed using a transmission electron microscope may be used as the mean particle diameter of the catalytic metal particles. The same goes for the following description.

In a preferred embodiment, the first catalyst layer 20 includes the catalytic metal that is Rh. The content of Rh per unit volume (1 liter) of the substrate 10 is preferably between about 0.05 g and 3 g (e.g., between 0.1 g and 2 g) and typically between 0.2 g and 1 g. An excessively small content of Rh may result in insufficient catalytic activity provided by Rh. An excessively large content of Rh is likely to cause grain growth of Rh and is at the same time disadvantageous in terms of cost.

The first catalyst layer 20 is usually formed by supporting the catalytic metal on a support. Examples of the support include: metallic oxides, such as alumina ($Al_2O_3$), zirconia (ZrO$_2$), ceria (CeO$_2$), silica (SiO$_2$), magnesia (MgO), and titanium oxide or titania (TiO$_2$); and solid solutions of these metallic oxides. Examples of the solid solutions include a ceria-zirconia (CeO$_2$—ZrO$_2$) composite oxide. Alumina or a ceria-zirconia composite oxide, in particular, is preferably used. Two or more of these metallic oxides and solid solutions may be used in combination. Other material(s) may be added, in the form of secondary component(s), to the support. Examples of substances that may be added to the support include: rare-earth elements, such as lanthanum (La) and yttrium (Y); alkaline-earth elements, such as calcium; and transition metal elements. These elements may be in the form of inorganic oxides. Of the elements just mentioned, a rare-earth element, such as lanthanum or yttrium, is suitably usable as a stabilizer because such a rare-earth element is able to increase specific surface area at high temperatures without inhibiting a catalytic function.

Although the support is not limited to any particular shape (or outer shape), the support in a powder form is preferably used from the viewpoint of creating a larger specific surface area. In one example, the mean particle diameter of the support is, for example, 20 or less, typically 10 μm or less, and preferably 7 μm or less, for example. The support having an excessively large mean particle diameter is not preferable because the dispersibility of precious metal supported on the support tends to decrease, resulting in a reduction in purification performance of the catalyst. The mean particle diameter may be, for example, 5 μm or less or may typically be 3 μm or less. The support having an excessively small mean particle diameter is not preferable because the heat resistance of the support itself decreases, which eventually degrades the heat-resisting characteristic of the whole catalyst. Accordingly, the mean particle diameter is preferably about 0.1 μm or more (e.g., 0.5 μm or more) in normal cases. A mean particle diameter measured on a volumetric basis by a laser diffracting and scattering method is usable as the mean particle diameter of the support. The same goes for the following description.

Although the amount of the catalytic metal supported on the support is not limited to any particular amount, a suitable amount of the catalytic metal is between about 0.001 mass percent and about 10 mass percent (e.g., between 0.01 mass percent and 8 mass percent) and typically between 0.015 mass percent and 5 mass percent with respect to the total mass of the support supporting the catalytic metal of the first catalyst layer 20. An excessively small amount of the catalytic metal supported may result in insufficient catalytic activity provided by the catalytic metal. An excessively large amount of the catalytic metal supported is likely to cause grain growth of the catalytic metal and is at the same time disadvantageous in terms of cost.

The catalytic metal particles may be supported on the support by any method. One example first involves impregnating the support with an aqueous solution containing a catalytic metal salt (e.g., nitrate) and/or a catalytic metal complex (e.g., a tetraammine complex), and then involves removing the support from the aqueous solution so as to dry and fire the support. This enables the catalytic metal particles to be supported on the support.

In addition to the support supporting the catalytic metal particles, a catalytic promoter that does not support the catalytic metal particles may be added to the first catalyst layer 20. Examples of the catalytic promoter include a ceria-zirconia (CeO$_2$—ZrO$_2$) composite oxide, alumina (Al$_2$O$_3$), and silica (SiO$_2$). A ceria-zirconia composite oxide or alumina, in particular, is preferably used. When the total mass percentage of the catalytic metal particles, the support, and the catalytic promoter is 100 percent, a suitable content of the catalytic promoter is usually 80 mass percent or less (e.g., between 30 mass percent and 80 mass percent inclusive). The content of the catalytic promoter is preferably, for example, 70 mass percent or less (e.g., between 40 mass percent and 60 mass percent inclusive).

The coating amount of the first catalyst layer 20 per unit volume (1 liter) of the substrate 10 (i.e., a value calculated by dividing the mass of the first catalyst layer 20 by the volume of the entire substrate 10) is not limited to any particular value. The volume of the entire substrate 10 is a bulk volume including the volumes of cell passages. The coating amount of the first catalyst layer 20 is preferably about 150 g/L or less. From the viewpoint of reducing a pressure loss, for example, the coating amount of the first catalyst layer 20 is preferably 120 g/L or less, more preferably 100 g/L or less, and still more preferably 80 g/L or less. In some embodiments, the coating amount of the first catalyst layer 20 may be, for example, 50 g/L or less or may typically be 30 g/L or less. A lower limit to the coating amount of the first catalyst layer 20 is not limited to any particular value. From the viewpoint of enhancing, for example, purification performance, the lower limit is preferably 5 g/L or more, more preferably 8 g/L or more, and still more preferably 10 g/L or more. In one example, the coating amount of the first catalyst layer 20 may be 12 g/L or more or may typically be 15 g/L or more. Although the coating amount of the catalyst layer per unit volume (1 liter) of the substrate 10 is the same, the techniques disclosed herein are able to provide purification performance higher than before and are thus technically valuable in this respect.

Second Catalyst Layer

The second catalyst layer 30 is formed in regions inside the partition 16 and in contact with the outlet cells 14 such that the second catalyst layer 30 has a predetermined length in the direction of extension from the exhaust gas outflow end 10$b$. A length (or average length) L$_2$ of the second catalyst layer 30 in the direction of extension is not limited to any particular length. The length L$_2$ of the second catalyst layer 30 may be shorter than the total length L$_w$ of the partition 16. In other words, the lengths L$_2$ and L$_w$ may satisfy the following relationship: L$_2$<L$_w$. From the viewpoint of efficiently purifying exhaust gas and reducing a pressure loss, for example, the length L$_2$ of the second catalyst layer 30 is about 20% or more of the length L$_w$ (which means that 0.2L$_w$≤L$_2$), typically 25% or more of the length L$_w$, and preferably 30% or more (e.g., 35% or more) of the length L$_w$. In some embodiments, the length L$_2$ of the second catalyst layer 30 may be, for example, 40% or more of the length L$_w$ or may typically be 45% or more of the length L$_w$. In some embodiments, the length L$_2$ of the second catalyst layer 30 may be, for example, 50% or more of the length L$_w$ or may typically be 55% or more (e.g., 60% or more) of the length L$_w$. From the viewpoint of enhancing manufacturability and quality stability, the length L$_2$ of the second catalyst layer 30 is about 90% or less of the length L$_w$ (which means that L$_2$≤0.9L$_w$), typically 85% or less (e.g., 80% or less) of the length L$_w$, and optionally 70% or less of the length L$_w$ (which means that L$_2$≤0.7L$_w$). In some embodiments, the length L$_2$ of the second catalyst layer 30 may be about 65% or less of the length L$_w$, may be, for example, 60% or less of the length L$_w$, or may typically be 55% or less of the length L$_w$. The length L$_2$ of the second catalyst layer 30 may be, for example, 50% or less of the length L$_w$ or may typically be 45% or less of the length L$_w$. The techniques disclosed herein may be preferably carried out in an embodiment where the length L$_2$ of the second catalyst layer 30 is determined in relation to the total length $L_w$ of the partition 16 such that $0.2L_w \leq L_2 \leq 0.8L_w$, $0.2L_w \leq L_2 \leq 0.7L_w$, $0.3L_w \leq L_2 \leq 0.65L_w$, $0.45L_w \leq L_2 \leq 0.8L_w$, or $0.7L_w \leq L_2 \leq 0.8L_w$.

In a preferred embodiment, the total length $L_w$ of the partition 16, the length $L_1$ of the first catalyst layer 20, and the length $L_2$ of the second catalyst layer 30 satisfy the following expression: $L_w < (L_1+L_2) < 2L_w$. In other words, the first catalyst layer 20 and the second catalyst layer 30 partially overlap with each other in the direction of extension of the partition 16. Overlapping the first catalyst layer 20 and the second catalyst layer 30 in the direction of extension allows exhaust gas component(s) to more suitably come into contact with the catalyst layers. This precludes exhaust gas from passing through a region where no catalyst layer is formed and being emitted in an unpurified state. Consequently, emission of unpurified exhaust gas is more effectively reduced.

A length along which the first catalyst layer 20 and the second catalyst layer 30 overlap with each other in the direction of extension is normally 2% or more of the length $L_w$ and typically 5% or more (e.g., 10% or more) of the length $L_w$. The overlapping length is about 60% or less of the length $L_w$, typically 50% or less of the length $L_w$, and preferably 40% or less of the length $L_w$. In some embodiments, the overlapping length may be 30% or less (e.g., 20% or less) of the length $L_w$. From the viewpoint of achieving, to a high degree, both of low cost and high performance, in particular, the overlapping length is preferably between about 5% and about 60% (e.g., between 5% and 40%) of the length $L_w$.

The second catalyst layer 30 may include a catalytic metal that functions as an oxidation and/or reduction catalyst, and a support that supports the catalytic metal. Examples of the catalytic metal include precious metals belonging to the platinum group, such as rhodium (Rh), palladium (Pd), and platinum (Pt). Alternatively, any of the following metals may be used: ruthenium (Ru), osmium (Os), iridium (Ir), silver (Ag), and gold (Au). An alloy of two or more of these metals may be used. The catalytic metal may be other types of metal, such as alkali metal, alkaline-earth metal, and transition metal. The mean particle diameter of the catalytic metal particles is normally between about 0.1 nm and about 20 nm (e.g., between 1 nm and 10 nm), typically 7 nm or less, and preferably 5 nm or less.

In a preferred embodiment, the second catalyst layer 30 includes the catalytic metal that is Pd. Pd contained in the second catalyst layer 30 and Rh contained in the first catalyst layer 20 more successfully enhance exhaust gas purification performance. The content of Pd per unit volume (1 liter) of the substrate 10 is preferably between about 0.1 g and about 10 g (e.g., between 0.3 g and 6 g) and typically between 0.5 g and 3 g. An excessively small content of Pd may result in insufficient catalytic activity provided by Pd. An excessively large content of Pd is likely to cause grain growth of Pd and is at the same time disadvantageous in terms of cost.

The ratio of the content of Rh in the first catalyst layer 20 to the content of Pd in the second catalyst layer 30, i.e., a content ratio (Rh/Pd), is not limited to any particular ratio. The content ratio is preferably between about 0.1 and about 2 inclusive. From the viewpoint of enhancing, for example, purification performance, the content ratio is preferably between 0.1 and 1.5 inclusive, more preferably between 0.15 and 1 inclusive (e.g., 0.15 or more and less than 1), still more preferably between 0.2 and 0.8 inclusive, and particularly preferably between 0.3 and 0.6 inclusive. The content ratio (Rh/Pd) falling within these ranges makes it possible to more successfully achieve the effects described above.

The second catalyst layer 30 is usually formed by supporting the catalytic metal on a support. Examples of the support include: metallic oxides, such as alumina ($Al_2O_3$), zirconia ($ZrO_2$), ceria ($CeO_2$), silica ($SiO_2$), magnesia (MgO), and titanium oxide or titania ($TiO_2$); and solid solutions of these metallic oxides. Examples of the solid solutions include a ceria-zirconia ($CeO_2$—$ZrO_2$) composite oxide. Alumina or a ceria-zirconia composite oxide, in particular, is preferably used. Two or more of these metallic oxides and solid solutions may be used in combination. Other material(s) may be added, in the form of secondary component(s), to the support. Examples of substances that may be added to the support include: rare-earth elements, such as lanthanum (La) and yttrium (Y); alkaline-earth elements, such as calcium; and transition metal elements. These elements may be in the form of inorganic oxides. Of the elements just mentioned, a rare-earth element, such as lanthanum or yttrium, is suitably usable as a stabilizer because such a rare-earth element is able to increase specific surface area at high temperatures without inhibiting a catalytic function.

Although the support is not limited to any particular shape (or outer shape), the support in a powder form is preferably used from the viewpoint of creating a larger specific surface area. In one example, the mean particle diameter of the support is, for example, 20 or less, typically 10 μm or less, and preferably 7 μm or less, for example. The support having an excessively large mean particle diameter is not preferable because the dispersibility of precious metal supported on the support tends to decrease, resulting in a reduction in purification performance of the catalyst. The mean particle diameter may be, for example, 5 μm or less or may typically be 3 μm or less. The support having an excessively small mean particle diameter is not preferable because the heat resistance of the support itself decreases, which eventually degrades the heat-resisting characteristic of the catalyst. Accordingly, the mean particle diameter is preferably about 0.1 μm or more (e.g., 0.5 μm or more) in normal cases.

Although the amount of the catalytic metal supported on the support is not limited to any particular amount, a suitable amount of the catalytic metal is between about 0.01 mass percent and about 10 mass percent (e.g., between 0.1 mass percent and 8 mass percent) and typically between 0.2 mass percent and 5 mass percent with respect to the total mass of the support supporting the catalytic metal of the second catalyst layer 30. An excessively small amount of the catalytic metal supported may result in insufficient catalytic activity provided by the catalytic metal. An excessively large amount of the catalytic metal supported is likely to cause grain growth of the catalytic metal and is at the same time disadvantageous in terms of cost.

The catalytic metal particles may be supported on the support by any method. One example first involves impregnating the support with an aqueous solution containing a catalytic metal salt (e.g., nitrate) and/or a catalytic metal complex (e.g., a tetraammine complex), and then involves removing the support from the aqueous solution so as to dry and fire the support. This enables the catalytic metal particles to be supported on the support.

In addition to the support supporting the catalytic metal particles, a catalytic promoter that does not support the catalytic metal particles may be added to the second catalyst layer 30. Examples of the catalytic promoter include a ceria-zirconia ($CeO_2$—$ZrO_2$) composite oxide, alumina ($Al_2O_3$), and silica ($SiO_2$). A ceria-zirconia composite oxide or alumina, in particular, is preferably used. When the total mass percentage of the catalytic metal particles, the support, and the catalytic promoter is 100 percent, a suitable content of the catalytic promoter is usually 80 mass percent or less (e.g., between 30 mass percent and 80 mass percent inclusive). The content of the catalytic promoter is preferably, for example, 70 mass percent or less (e.g., between 40 mass percent and 60 mass percent inclusive).

In a preferred embodiment, barium is added to the second catalyst layer 30. Adding barium prevents poisoning of the catalytic metal, improving catalytic activity. Adding barium also improves dispersibility of the catalytic metal so as to more successfully prevent sintering incident to grain growth of the catalytic metal at high temperatures. This results in an increase in durability of the catalyst. The amount of barium to be added in terms of $BaSO_4$ may be between 0.5 mass percent and 10 mass percent inclusive with respect to the total mass of the second catalyst layer 30. The amount of barium to be added is preferably between 1 mass percent and 8 mass percent inclusive, more preferably between 2 mass percent and 6 mass percent inclusive, and still more preferably between 3 mass percent and 5 mass percent inclusive. Making the barium-containing second catalyst layer 30 may involve: preparing a barium solution by dissolving, for example, a water-soluble barium salt (e.g., barium sulfate) in water (which is typically ion-exchange water); adding the barium solution to, for example, the support; and firing the support.

The coating amount of the second catalyst layer 30 per unit volume (1 liter) of the substrate 10 (i.e., a value calculated by dividing the mass of the second catalyst layer 30 by the volume of the entire substrate 10) is not limited to any particular value. The volume of the entire substrate 10 is a bulk volume including the volumes of cell passages. The coating amount of the second catalyst layer 30 is preferably about 200 g/L or less. From the viewpoint of reducing a pressure loss, for example, the coating amount of the second catalyst layer 30 is preferably 180 g/L or less, more preferably 150 g/L or less, and still more preferably 120 g/L or less. In some embodiments, the coating amount of the second catalyst layer 30 may be, for example, 100 g/L or less or may typically be 80 g/L or less (e.g., 60 g/L or less). A lower limit to the coating amount of the second catalyst layer 30 is not limited to any particular value. From the viewpoint of enhancing, for example, purification performance, the lower limit is preferably 20 g/L or more, more preferably 25 g/L or more, and still more preferably 30 g/L or more. In one example, the coating amount of the second catalyst layer 30 may be 35 g/L or more or may typically be 40 g/L or more. Although the coating amount of the catalyst layer per unit volume (1 liter) of the substrate 10 is the same, the techniques disclosed herein are able to provide purification performance higher than before and are thus technically valuable in this respect.

The first catalyst layer 20 and the second catalyst layer 30 are preferably formed on the basis of different slurries. One example involves preparing a first catalyst layer forming slurry to form the first catalyst layer 20, and a second catalyst layer forming slurry to form the second catalyst layer 30. The first catalyst layer forming slurry contains components (such as a catalytic metal salt of, for example, Rh and support powder) included in the first catalyst layer 20. The second catalyst layer forming slurry contains components (such as a catalytic metal salt of, for example, Pd and support powder) included in the second catalyst layer 30. The first catalyst layer forming slurry and the second catalyst layer forming slurry may contain, in addition to the catalytic metal salts and support powder just mentioned, any additional components known in the art, such as a binder, an oxygen absorbing and releasing material, and an additive, when necessary. A ceria-zirconia composite oxide that serves as a support or a non-support may suitably be used as the oxygen absorbing and releasing material. An alumina sol or a silica sol, for example, may be used as the binder.

The first catalyst layer forming slurry prepared is supplied into the inlet cells 12 through the exhaust gas inflow end 10a of the substrate 10 so as to apply the slurry to regions inside the pores of the partition 16 where the first catalyst layer 20 is to be formed. Specifically, the slurry is sucked under reduced pressures from the outlet cells 14 such that the regions of the partition 16 are coated with the slurry from the end 10a of the substrate toward the end 10b thereof along the length $L_1$. The slurry is sucked under reduced pressures from the outlet cells 14 such that the regions of the partition 16 are coated with the slurry from the surfaces of the partition 16 in contact with the inlet cells 12 to a depth that is between 40% and 60%, inclusive, of the thickness $T_w$ of the partition 16. The second catalyst layer forming slurry prepared is supplied into the outlet cells 14 through the exhaust gas outflow end 10b of the substrate 10 so as to apply the slurry to regions inside the pores of the partition 16 where the second catalyst layer 30 is to be formed. Specifically, the slurry is sucked under reduced pressures from the inlet cells 12 such that the regions of the partition 16 are coated with the slurry from the end 10b of the substrate toward the end 10a thereof along the length La. The slurry is sucked under reduced pressures from the inlet cells 12 such that the regions of the partition 16 are coated with the slurry from the surfaces of the partition 16 in contact with the outlet cells 14 to a depth that is 90% or more of the thickness $T_w$ of the partition 16.

The honeycomb substrate 10 having the slurries applied thereto is dried and fired at a predetermined temperature for a predetermined period of time. Although drying conditions for the slurries depend on the shape and size of the substrate or support, the slurries are typically dried at a temperature of between about 80° C. and about 300° C. (e.g., between 100° C. and 250° C.) for about one hour to about ten hours. The slurries are typically fired at a temperature of between about 400° C. and about 1000° C. (e.g., between 500° C. and 700° C.) for about one hour to about four hours. As a result of this procedure, the exhaust gas purifying catalyst 100 is manufactured.

As indicated by the arrows in FIG. 4, the exhaust gas purifying catalyst 100 according to the present embodiment allows exhaust gas to flow into the inlet cells 12 through the exhaust gas inflow end 10a of the substrate 10. The exhaust gas having flowed into the inlet cells 12 passes through the partition 16 and reaches the outlet cells 14. During passage of the exhaust gas through the partition 16, PM is collected on the surface of the partition 16 and/or collected into the pores inside the partition 16 because the partition 16 has the porous structure. A surface layer of the partition 16 on the exhaust gas inflow side is provided with the first catalyst layer 20. Substantially the entire region of the partition 16 on the exhaust gas outflow side is provided with the second catalyst layer 30. Harmful components contained in the exhaust gas may thus be purified during passage of the exhaust gas through the inside of the partition 16. The exhaust gas, having passed through the partition 16 and reached the outlet cells 14, is then emitted to the outside of the exhaust gas purifying catalyst through openings on the exhaust gas outflow side.

Test examples concerning the present invention will be described below. The following description, however, is not intended to limit the present invention to the test examples below.

Test Examples I

Example 1

A Rh nitrate solution, alumina ($Al_2O_3$) powder, ceria-zirconia composite oxide powder, an alumina-based binder, and ion-exchange water were mixed so as to prepare a slurry A. The slurry A was then supplied into inlet cells through an exhaust gas inflow end of a honeycomb substrate made of cordierite, so that the inside of pores of a partition in contact with the inlet cells was coated with the slurry A. The slurry A was dried and fired so as to form a first catalyst layer inside the partition. Adjustments were made to the contents of the components of the slurry A per unit volume (1 liter) of the substrate such that the content of Rh was 0.3 g/L, the content of alumina was 6.53 g/L, and the content of ceria-zirconia composite oxide was 11.25 g/L. A length (or coating width) $L_1$ of the first catalyst layer in the direction of extension was 70% of a total length $L_w$ of the partition. A thickness $T_1$ of the first catalyst layer was 60% of an overall thickness $T_w$ of the partition.

A Pd nitrate solution, alumina ($Al_2O_3$) powder, ceria-zirconia composite oxide powder, barium sulfate ($BaSO_4$), an alumina-based binder, and ion-exchange water were mixed so as to prepare a slurry B. The slurry B was then supplied into outlet cells through an exhaust gas outflow end of the substrate, so that the inside of pores of the partition in contact with the outlet cells was coated with the slurry B. The slurry B was dried and fired so as to form a second catalyst layer inside the partition. Adjustments were made to the contents of the components of the slurry B per unit volume (1 liter) of the substrate such that the content of Pd was 0.6 g/L, the content of alumina was 12.25 g/L, the content of ceria-zirconia composite oxide was 31.85 g/L, and the content of barium sulfate was 1.8 g/L. A length (or coating width) $L_2$ of the second catalyst layer in the direction of extension was 45% of the total length $L_w$ of the partition. A thickness $T_2$ of the second catalyst layer was 100% of the overall thickness $T_w$ of the partition. Thus, a filter catalyst including the first catalyst layer and the second catalyst layer located inside the partition was fabricated.

Example 2

A filter catalyst was fabricated by following the same procedure as that in Example 1, except that the thickness $T_1$ of the first catalyst layer was changed to 40% of the thickness $T_w$.

Comparative Example 1

A filter catalyst was fabricated by following the same procedure as that in Example 1, except that the content of Pd in the second catalyst layer was changed to 1.5 g/L and the thickness $T_2$ of the second catalyst layer was changed to 60% of the thickness $T_w$.

Comparative Example 2

A filter catalyst was fabricated by following the same procedure as that in Example 1, except that the thickness $T_2$ of the second catalyst layer was changed to 60% of the thickness $T_w$.

Comparative Example 3

A filter catalyst was fabricated by following the same procedure as that in Example 1, except that the content of Rh in the first catalyst layer was changed to 0.15 g/L, the content of Pd in the second catalyst layer was changed to 1.5 g/L, and the thickness $T_2$ of the second catalyst layer was changed to 60% of the thickness $T_w$.

Comparative Example 4

A filter catalyst was fabricated by following the same procedure as that in Example 1, except that the thickness $T_1$ of the first catalyst layer was changed to 30% of the thickness $T_w$.

Comparative Example 5

A filter catalyst was fabricated by following the same procedure as that in Example 1, except that the thickness $T_1$ of the first catalyst layer was changed to 80% of the thickness $T_w$.

Table 1 provides a summary of the thickness $T_1$ of the first catalyst layer, the thickness $T_2$ of the second catalyst layer, the content of Rh in the first catalyst layer, and the content of Pd in the second catalyst layer for the filter catalyst fabricated in each of the above examples. The content of Rh in each example is represented as a relative value when the content of Rh in Comparative Example 1 is 100%. The content of Pd in each example is represented as a relative value when the content of Pd in Comparative Example 1 is 100%.

TABLE 1

|  | First Catalyst Layer Thickness $T_1$ (%) | Second Catalyst Layer Thickness $T_2$ (%) | Rh Content in First Catalyst Layer (%) | Pd Content in Second Catalyst Layer (%) | Pressure Drop Ratio Relative to Comparative Ex. 1 | NOx Purification Ratio Relative to Comparative Ex. 1 |
|---|---|---|---|---|---|---|
| Ex. 1 | 60 | 100 | 100 | 40 | 0.33 | 1.003 |
| Ex. 2 | 40 | 100 | 100 | 40 | 0.47 | 1.004 |
| Comparative Ex. 1 | 60 | 60 | 100 | 100 | 1.00 | 1.000 |
| Comparative Ex. 2 | 60 | 60 | 100 | 40 | 1.00 | 0.984 |
| Comparative Ex. 3 | 60 | 60 | 50 | 100 | 1.00 | 0.953 |
| Comparative Ex. 4 | 30 | 100 | 100 | 40 | 1.13 | 0.989 |
| Comparative Ex. 5 | 80 | 100 | 100 | 40 | 0.27 | 0.975 |

Measurement of NOx Purification Ratio

Figure 5:
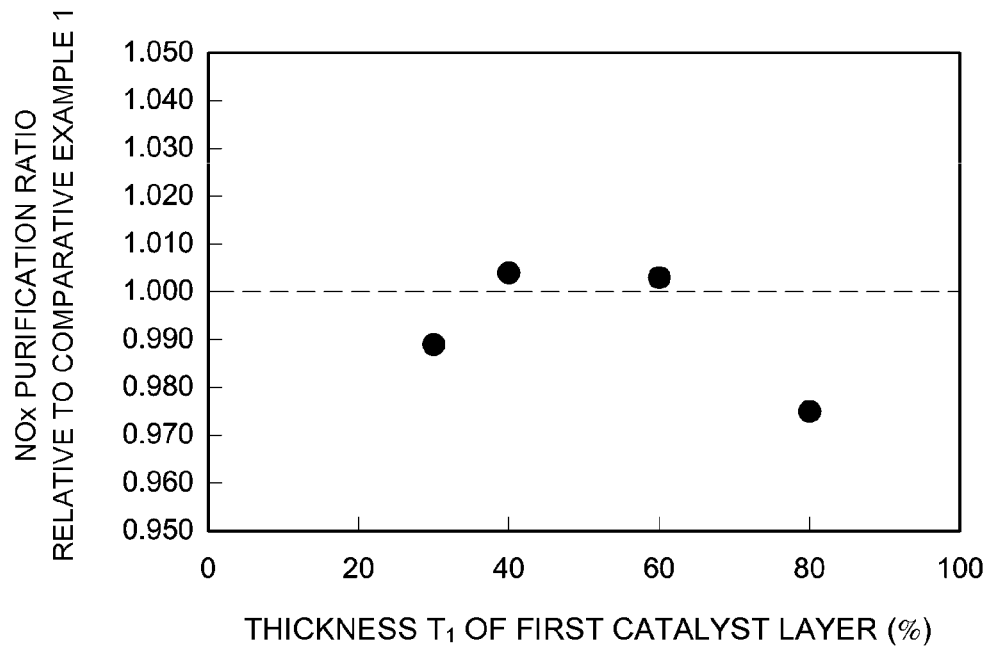
FIG. 5 is a graph illustrating the relationship between a thickness $T_1$ of a first catalyst layer and a NOx purification ratio.

The filter catalyst fabricated in each of the above examples was disposed in an exhaust system for an engine. Exhaust gas was flowed into the catalyst while the temperature of the gas entering the catalyst was increased at a temperature increase rate of 10° C./min using a heat exchanger until the gas temperature increased from 100° C. to 520° C. A NOx component purification ratio was continuously measured from a ratio between the concentration of the entering gas and the concentration of exiting gas so as to estimate the temperature of the gas entering the catalyst ($T_{50}$–NOx) when the NOx component purification ratio reached 50%. For each of the examples, a relative value with respect to $T_{50}$–NOx for Comparative Example 1 (which is 1.000) was converted into a reciprocal, and the value of the reciprocal was calculated in the form of a NOx purification ratio. Results of the measurement are given in Table 1 and FIG. 5. FIG. 5 is a graph illustrating the relationship between the thickness $T_1$ of the first catalyst layer and the NOx purification ratio for Examples 1 and 2 and Comparative Examples 4 and 5. The graph suggests that the greater the NOx purification ratio, the higher the NOx purification performance.

Measurement of Pressure Drop Ratio

Figure 6:
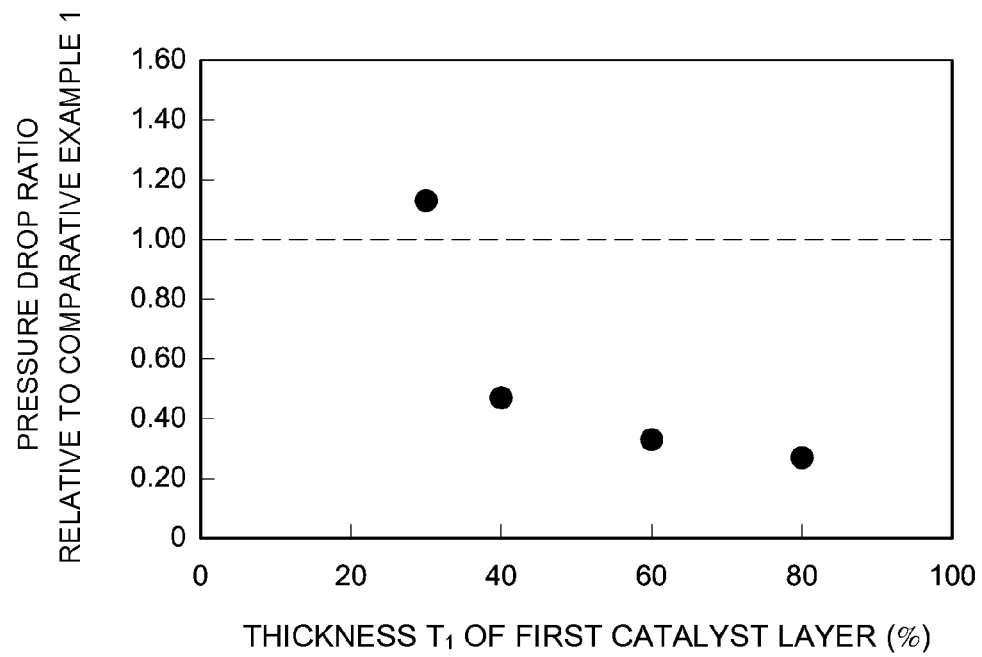
FIG. 6 is a graph illustrating the relationship between the thickness $T_1$ of the first catalyst layer and a pressure drop ratio.

The filter catalyst fabricated in each of the above examples was disposed on a blower type pressure drop measuring device so as to measure a pressure drop from a static pressure difference between positions in front of and behind each filter catalyst. The flow rate of air was set at 3 m³/min. Results of the measurement are given in Table 1 and FIG. 6. FIG. 6 is a graph illustrating the relationship between the thickness $T_1$ of the first catalyst layer and the pressure drop ratio for Examples 1 and 2 and Comparative Examples 4 and 5. The pressure drop ratio for each of the examples is represented as a relative value when the pressure drop for Comparative Example 1 is 1.00.

As illustrated in Table 1 and FIGS. 5 and 6, the filter catalysts fabricated in Examples 1 and 2 (where the thickness $T_1$ of the first catalyst layer was between 40% and 60%, inclusive, of the thickness $T_w$ and the second catalyst layer 30 was formed across the entire region of the partition in a thickness direction thereof) produce more favorable results than the filter catalysts fabricated in Comparative Examples 1 to 5 in terms of the NOx purification ratio. Pressure drops in the filter catalysts fabricated in Examples 1 and 2 are markedly lower than those in Comparative Examples 1 to 4. These results reveal that purification performance may be enhanced, with a pressure drop kept low, by fabricating a filter catalyst such that the thickness $T_1$ of the first catalyst layer is between 40% and 60%, inclusive, of the thickness $T_w$ and the second catalyst layer 30 is formed across the entire region of the partition in the thickness direction thereof.

Test Examples II

Examples 3 to 5

Filter catalysts were fabricated by following the same procedure as that in Example 1, except that the length $L_1$ of the first catalyst layer and the length $L_2$ of the second catalyst layer were changed as indicated in Table 2, and the content of Pd in the second catalyst layer was changed to 1.5 g/L. NOx purification ratios and pressure drop ratios were measured in manners similar to those in Test Examples I. Results of the measurement are given in Table 2 and FIGS. 7 and 8. For each of the examples, the NOx purification ratio is represented as a relative value with respect to $T_{50}$–NOx for Example 3 (which is 1.000), and the pressure drop ratio is represented as a relative value when the pressure drop in Example 3 is 1.00. Although the length $L_2$ of the second catalyst layer and the content of Pd in the second catalyst layer in Example 1 differ from those in the other examples in a strict sense, data on Example 1 and data on Examples 3 to 5 are given together in the same table.

TABLE 2

(Studies on Length $L_1$ of First Catalyst Layer)

|  | First Catalyst Layer Length $L_1$ (%) | Second Catalyst Layer Length $L_2$ (%) | First Catalyst Layer Thickness $T_1$ (%) | Second Catalyst Layer Thickness $T_2$ (%) | Rh Content in First Catalyst Layer (%) | Pd Content in Second Catalyst Layer (%) | Pressure Drop Ratio Relative to Example 3 | NOx Purification Ratio Relative to Example 3 |
|---|---|---|---|---|---|---|---|---|
| Ex. 1 | 70 | 45 | 60 | 100 | 100 | 40 | 0.33 | 1.019 |
| Ex. 3 | 50 | 55 | 60 | 100 | 100 | 100 | 1.00 | 1.000 |
| Ex. 4 | 80 | 55 | 60 | 100 | 100 | 100 | 0.33 | 1.028 |
| Ex. 5 | 90 | 55 | 60 | 100 | 100 | 100 | 0.33 | 1.028 |

Figure 7:
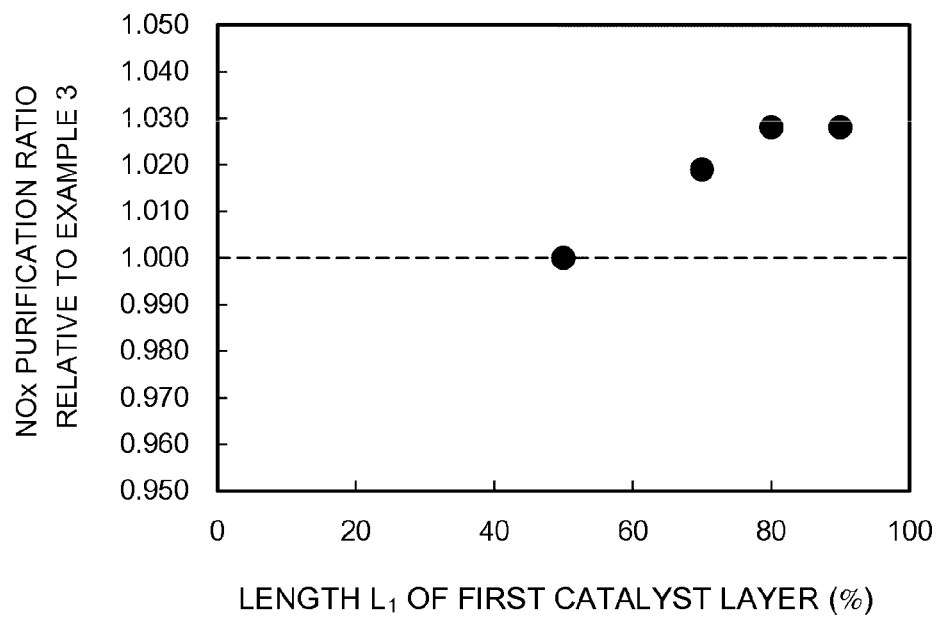
FIG. 7 is a graph illustrating the relationship between a length $L_1$ of the first catalyst layer and a NOx purification ratio.
Figure 8:
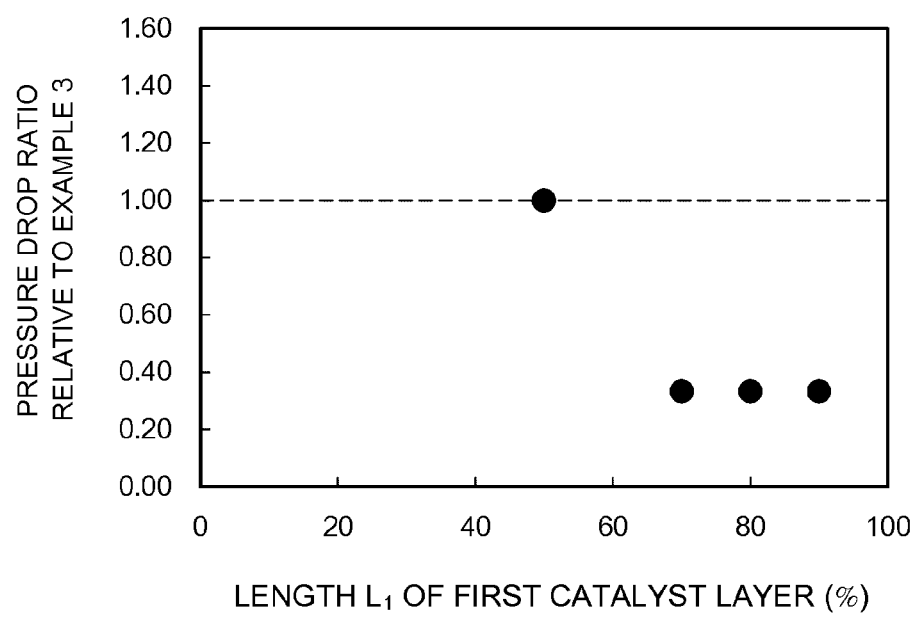
FIG. 8 is a graph illustrating the relationship between the length $L_1$ of the first catalyst layer and a pressure drop ratio.

As illustrated in Table 2 and FIGS. 7 and 8, these results reveal that purification performance may be enhanced to a higher level, with a pressure drop kept low, by fabricating a filter catalyst such that the length $L_1$ of the first catalyst layer is between 50% and 90%, inclusive, of the length $L_w$, preferably between 70% and 90%, inclusive, of the length $L_w$, and more preferably between 80% and 90%, inclusive, of the length $L_w$, in addition to setting the thickness $T_1$ of the first catalyst layer and the thickness $T_2$ of the second catalyst layer at the values described in Example 1.

Test Examples III

Examples 6 to 8

Filter catalysts were fabricated by following the same procedure as that in Example 1, except that the length $L_1$ of the first catalyst layer and the length $L_2$ of the second catalyst layer were changed as indicated in Table 3, and the content of Pd in the second catalyst layer was changed to 1.5 g/L. NOx purification ratios and pressure drop ratios were measured in manners similar to those in Test Examples I. Results of the measurement are given in Table 3 and FIGS. 9 and 10. For each of the examples, the NOx purification ratio is represented as a relative value with respect to $T_{50}$–NOx for Example 6 (which is 1.000), and the pressure drop ratio is represented as a relative value when the pressure drop in Example 6 is 1.00. Although the length $L_2$ of the second catalyst layer and the content of Pd in the second catalyst layer in Example 1 differ from those in the other examples in a strict sense, data on Example 1 and data on Examples 6 to 8 are given together in the same table.

TABLE 3

(Studies on Length $L_2$ of Second Catalyst Layer)

| | First Catalyst Layer Length $L_1$ (%) | Second Catalyst Layer Length $L_2$ (%) | First Catalyst Layer Thickness $T_1$ (%) | Second Catalyst Layer Thickness $T_2$ (%) | Rh Content in First Catalyst Layer (%) | Pd Content in Second Catalyst Layer (%) | Pressure Drop Ratio Relative to Example 6 | NOx Purification Ratio Relative to Example 6 |
|---|---|---|---|---|---|---|---|---|
| Ex. 1 | 70 | 45 | 60 | 100 | 100 | 40 | 0.50 | 1.004 |
| Ex. 6 | 80 | 20 | 60 | 100 | 100 | 100 | 1.00 | 1.000 |
| Ex. 7 | 80 | 70 | 60 | 100 | 100 | 100 | 0.60 | 1.011 |
| Ex. 8 | 80 | 80 | 60 | 100 | 100 | 100 | 0.50 | 1.014 |

Figure 9:
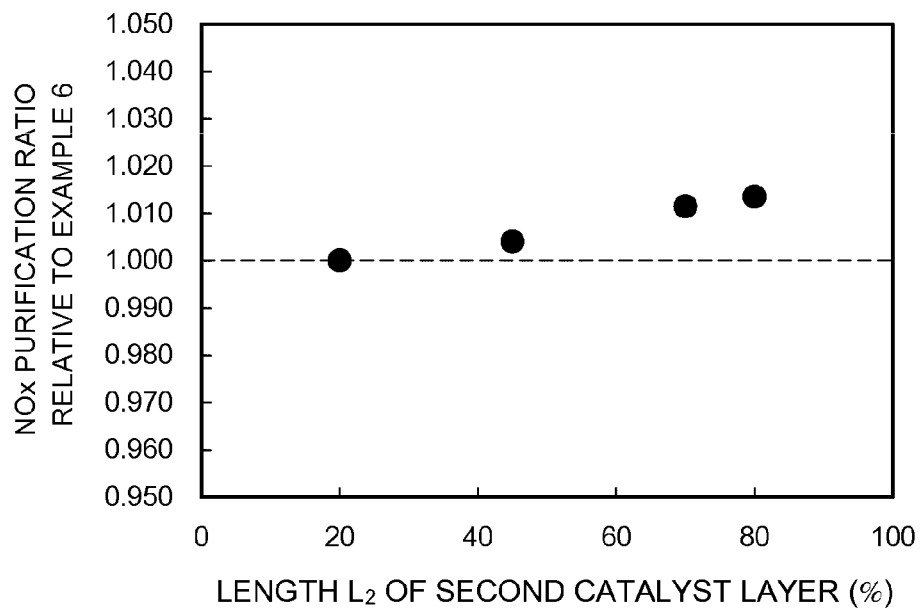
FIG. 9 is a graph illustrating the relationship between a length $L_2$ of a second catalyst layer and a NOx purification ratio.
Figure 10:
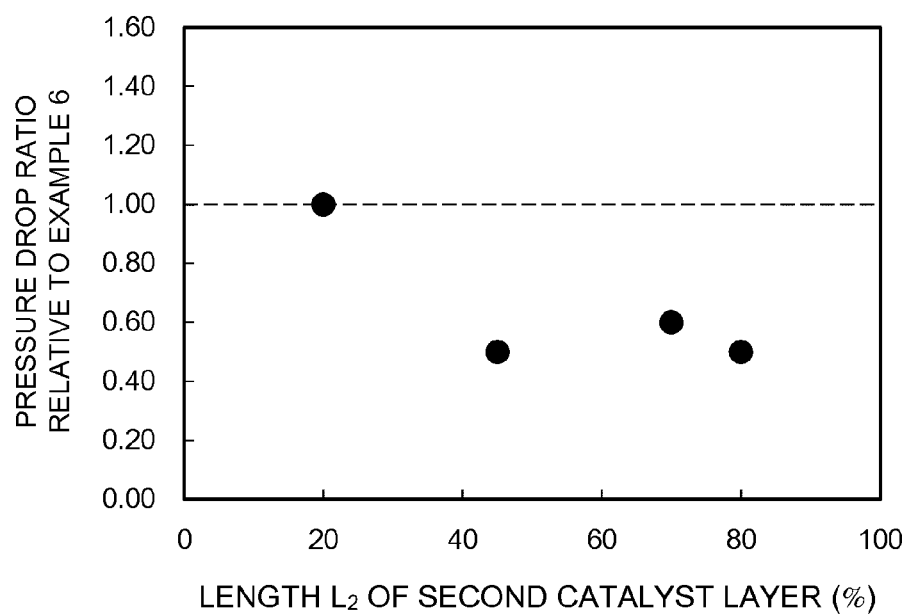
FIG. 10 is a graph illustrating the relationship between the length $L_2$ of the second catalyst layer and a pressure drop ratio.

As illustrated in Table 3 and FIGS. 9 and 10, these results reveal that purification performance may be enhanced to a higher level, with a pressure drop kept low, by fabricating a filter catalyst such that the length $L_2$ of the second catalyst layer is between 20% and 80%, inclusive, of the length $L_w$, preferably between 45% and 80%, inclusive, of the length $L_w$, and more preferably between 70% and 80%, inclusive, of the length $L_w$, in addition to setting the thickness $T_1$ of the first catalyst layer and the thickness $T_2$ of the second catalyst layer at the values described in Example 1.

Various modifications of the exhaust gas purifying catalyst 100 have been illustrated above. The structure of the exhaust gas purifying catalyst 100, however, is not limited to any of the embodiments described above.

In the foregoing embodiment, for example, the first catalyst layer 20 and the second catalyst layer 30 each have a single-layer structure. Alternatively, the first catalyst layer 20 and the second catalyst layer 30 may each have a multilayer structure including a plurality of layers (e.g., two to five layers) stacked one above the other. The first catalyst layer 20 and the second catalyst layer 30 may each be formed into a multilayer structure including an upper layer and a lower layer on the surfaces of pores inside the partition. The lower layer may be close to the surfaces of the pores. The upper layer may be relatively away from the surfaces of the pores.

Changes may be made to the shapes and structures of the components and elements of the exhaust gas purifier 1. Although the catalyst section 5 is provided upstream of the filter section 6, for example, in FIG. 1, the catalyst section 5 may be optional. The exhaust gas purifier 1 is particularly suitable as a device to purify harmful components contained in relatively high temperature exhaust gas emitted from, for example, a gasoline engine. The exhaust gas purifier 1 according to the present invention does not necessarily have to be used to purify harmful components contained in exhaust gas emitted from a gasoline engine but may be used for various purposes, such as purifying harmful components contained in exhaust gas emitted from other types of engine (e.g., a diesel engine).

REFERENCE SIGNS LIST 10 substrate
12 inlet cell
14 outlet cell
16 partition
20 first catalyst layer
30 second catalyst layer
100 exhaust gas purifying catalyst

The invention claimed is:

1. An exhaust gas purifying catalyst to purify exhaust gas emitted from an internal combustion engine, the exhaust gas purifying catalyst being disposed in an exhaust passage for the internal combustion engine, the exhaust gas purifying catalyst comprising:

a wall-flow structure substrate including
an inlet cell open only at an exhaust gas inflow end,
an outlet cell open only at an exhaust gas outflow end, and
a porous partition that partitions the inlet cell and the outlet cell;

a first catalyst layer formed in a region inside the partition and in contact with at least the inlet cell such that the first catalyst layer extends in a direction of extension of the partition from the exhaust gas inflow end; and a second catalyst layer formed in a region inside the partition and in contact with at least the outlet cell such that the second catalyst layer extends in the direction of extension of the partition from the exhaust gas outflow end, wherein assuming that the partition has an overall thickness $T_w$ in a thickness direction perpendicular to the direction of extension, the first catalyst layer is formed inside the partition such that a thickness $T_1$ of the first catalyst layer is between 40% and 60%, inclusive, of the thickness $T_w$, and the second catalyst layer is formed inside the partition such that the second catalyst layer extends across an entire region of the partition in the thickness direction; and assuming that the first catalyst layer has a length $L_1$, the second catalyst layer has a length $L_2$, and the porous partition has a total length $L_w$ in the direction of extension, the lengths $L_w$, $L_1$ and $L_2$ satisfy the following expression: $L_w<(L_1+L_2)<2 L_w$, and the first catalyst layer and the second catalyst layer partially overlap with each other in the direction of extension.

2. The exhaust gas purifying catalyst according to claim 1, wherein,
a length $L_1$ of the first catalyst layer is between 50% and 90%, inclusive, of a total length $L_w$ of the partition in the direction of extension.

3. The exhaust gas purifying catalyst according to claim 1, wherein
a length $L_2$ of the second catalyst layer is between 20% and 80%, inclusive, of a total length $L_w$ of the partition in the direction of extension.

4. The exhaust gas purifying catalyst according to claim 1, wherein
the first catalyst layer contains a precious metal that is rhodium (Rh), and
the second catalyst layer contains a precious metal that is palladium (Pd).

5. The exhaust gas purifying catalyst according to claim 4, wherein
 a ratio of a content of Rh in the first catalyst layer to a content of Pd in the second catalyst layer is between 0.1 and 2 inclusive, the ratio being represented as Rh/Pd.

6. The exhaust gas purifying catalyst according to claim 1, wherein
 the internal combustion engine is a gasoline engine.

\* \* \* \* \*